(12) United States Patent
Iba et al.

(10) Patent No.: US 9,014,852 B2
(45) Date of Patent: Apr. 21, 2015

(54) BEHAVIOR CONTROL SYSTEM

(71) Applicant: Honda Motor Co., Ltd., Tokyo (JP)

(72) Inventors: Soshi Iba, Wako (JP); Akinobu Hayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 71 days.

(21) Appl. No.: 13/774,380

(22) Filed: Feb. 22, 2013

(65) Prior Publication Data

US 2013/0345865 A1    Dec. 26, 2013

(30) Foreign Application Priority Data

Jun. 21, 2012 (JP) ................................. 2012-140256

(51) Int. Cl.
  *G05B 19/18* (2006.01)
  *B25J 9/16* (2006.01)

(52) U.S. Cl.
  CPC *B25J 9/163* (2013.01); *B25J 9/161* (2013.01); *G05B 2219/33054* (2013.01)

(58) Field of Classification Search
  USPC ................................................. 700/245–264
  See application file for complete search history.

(56) References Cited

U.S. PATENT DOCUMENTS

| | | |
|---|---|---|
| 2006/0248026 A1 | 11/2006 | Aoyama et al. |
| 2009/0234467 A1 | 9/2009 | Sabe et al. |
| 2009/0326679 A1 | 12/2009 | Iba |
| 2011/0059427 A1 | 3/2011 | Hans et al. |
| 2011/0160908 A1 | 6/2011 | Iba |

FOREIGN PATENT DOCUMENTS

| | | |
|---|---|---|
| DE | 102008020380 A1 | 12/2009 |
| EP | 2363251 A1 | 9/2011 |
| JP | 2010-005761 | 1/2010 |
| JP | 2011-148081 | 8/2011 |

OTHER PUBLICATIONS

Kruger, et al. "Imitation Learning of Non-Linear Point-to-Point Robot Motions using Dirichlet Processes", in: 2012 IEEE International Conference on Robotics and Automation, RiverCentre, Saint Paul, Minnesota, USA, May 14-18, 2012, pp. 2029-2034, 6 pages.
German Office Action with English Translation dated Dec. 10, 2013, 13 pages.
German Search Report with English Translation dated Dec. 9, 2013, 10 pages.

*Primary Examiner* — Bhavesh V Amin
(74) *Attorney, Agent, or Firm* — Rankin, Hill & Clark LLP (57) ABSTRACT

A system capable of causing an agent to continuously execute a plurality of different subtasks while securing the continuity of behavior of the agent is provided. A plurality of state variable trajectories representing the time series of a state variable of an object are generated according to a stochastic transition model in which the state variable of the object is represented as a random variable. The stochastic transition model is defined so that the transition mode of the state variable is determined according to an execution probability of each subtask in which a probability distribution is represented by a Dirichlet distribution. An operation of the agent is controlled so that the state of the object transits according to one state variable trajectory (desired state variable trajectory) maximizing or optimizing the joint probability of a whole of the stochastic transition model among the plurality of state variable trajectories.

7 Claims, 7 Drawing Sheets

FIG.7C

BEHAVIOR CONTROL SYSTEM

BACKGROUND OF THE INVENTION

1. Field of the Invention

The present invention relates to a system which controls the behavior of a robot to cause the robot to execute a plurality of subtasks.

2. Description of the Related Art

There has been proposed a technical method in which a state variable defining the behavior of an agent is defined by a continuous random variable in order to secure the continuity of the behavior of the agent and the behavior of the agent is controlled according to the trajectory of the state variable (Refer to Japanese Patent Application Laid-Open No. 2010-005761 and Japanese Patent Application Laid-Open No. 2011-148081).

In the case of causing the agent to execute a task composed of a series of different subtasks in a continuous manner, however, it is difficult to generate the trajectory of a state variable while adaptively setting the time point of switch between the subtasks. Therefore, the continuity of the behavior might be impaired such that the operation of the agent temporarily stops at the time of switch between the subtasks.

Therefore, it is an object of the present invention to provide a system capable of causing the agent to execute a plurality of different subtasks in a continuous manner while securing the continuity of the behavior of the agent.

SUMMARY OF THE INVENTION

According to an aspect of the present invention, there is provided a system configured to control a behavior of an agent to cause the agent to selectively execute a plurality of subtasks for an object, the system including: a first arithmetic processing element configured to generate a plurality of state variable trajectories which represent time series of a state variable of the object according to a stochastic transition model in which the state variable of the object is represented as a random variable and in which the transition mode of the state variable is determined depending on each execution probability of the plurality of subtasks in which a probability distribution is represented by a Dirichlet distribution; and a second arithmetic processing element configured to control an operation of the agent so that the state of the object transits according to a desired state variable trajectory which is one state variable trajectory maximizing or optimizing a joint probability of a whole of the stochastic transition model among the plurality of state variable trajectories generated by the first arithmetic processing element.

According to the behavior control system of the present invention, the plurality of state variable trajectories, which are the time series of the state variable are generated according to the stochastic transition model in which the transition mode of the state variable of the object is determined depending on each execution probability of the plurality of subtasks in which a probability distribution is represented by a Dirichlet distribution. Thereby, the plurality of state variable trajectories are generated with the consideration for various variation modes of subtasks selectively executed by the agent 1 according to a difference in the time-oriented variation mode of the Dirichlet distribution.

One state variable trajectory which the agent 1 follows among the plurality of state variable trajectories is generated as a desired state variable trajectory if it maximizes or optimizes the joint probability of the stochastic transition model. The desired state variable trajectory is generated on the basis of the stochastic transition model as described above. Therefore, the behavior of the agent accompanied by an interaction with the object is able to be controlled so that the continuity of the state variables representing the state of the object 2 is secured. As a result, while the executability of each subtask secures the continuity of behavior of the agent in time series, the behavior control system is able to cause the agent to execute a plurality of different subtasks continuously.

Preferably, the first arithmetic processing element is configured to generate a plurality of i-th state variable trajectories which represent time series of the state variable of the object according to an i-th stochastic transition model in which the transition mode of the state variable is determined depending on each execution probability of a subtask having an i-th execution order (i=1, 2, - - - ) and a subtask having an (i+1)-th execution order among the plurality of subtasks; and the second arithmetic processing element is configured to generate one i-th state variable trajectory which maximizes or optimizes a joint probability of a whole of the i-th stochastic transition model, as an i-th desired state variable trajectory, among the plurality of i-th state variable trajectories generated by the first arithmetic processing element, and to generate a connection trajectory of the i-th desired state variable trajectory as the desired state variable trajectory.

According to the behavior control system having the above configuration, only two subtasks are taken into consideration among a plurality of subtasks in each stochastic transition model. Therefore, the behavior control system is able to cause the agent to continuously execute the plurality of different subtasks while securing the continuity of behavior of the agent in parallel with a reduction in arithmetic processing load required for the generation of the state variable trajectory according to each stochastic transition model or with a decrease in arithmetic processing time.

Preferably, the first arithmetic processing element is configured to generate the plurality of state variable trajectories according to each of a plurality of stochastic transition models different in environmental factor, which is a stochastic transition model in which the transition mode of the state variable is determined depending on the environmental factor of the object, in addition to the respective execution probabilities of the plurality of subtasks; and the second arithmetic processing element is configured to estimate an environmental factor in one stochastic transition model which is a generation base of one state variable trajectory which maximizes or optimizes a joint probability of a whole of the stochastic transition model among the plurality of state variable trajectories generated by the first arithmetic processing element, as an actual environmental factor.

According to the behavior control system having the above configuration, an environmental factor, which is an uncertain element, is able to be estimated with a high degree of accuracy on the basis of the generation result of the desired state variable trajectory. The subsequent stochastic transition models are selected or constructed on the basis of the estimation result, thereby enabling the generation of a desired state variable trajectory which reflects the state of the object based on the actual environmental factor.

DESCRIPTION OF THE PREFERRED EMBODIMENTS (Structure)

Figure 1:
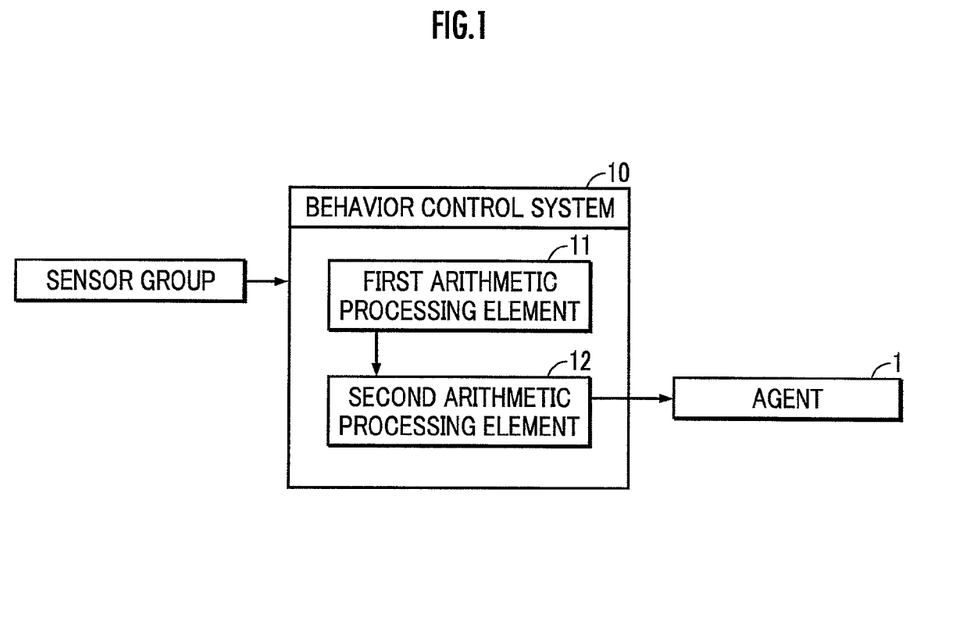
FIG. 1 is a configuration explanatory diagram illustrating a behavior control system of the present invention.

A behavior control system 10 illustrated in FIG. 1 is configured to control the behavior of an agent 1 by controlling the operation of an actuator installed in the agent 1. The behavior control system 10 is composed of, for example, an electronic control unit (composed of a CPU, a ROM, a RAM, an I/O circuit and the like) or a computer installed in the agent 1.

The agent 1 is, for example, an arm robot which is composed of a plurality of links connected to each other via a joint mechanism with a force transmitted from the actuator and is configured to be able to bend and stretch in the joint mechanism with the force transmitted from the actuator. The number of joint mechanisms and the degree of freedom (1 to 3) of each joint mechanism are able to be arbitrarily designed. The arm robot may be an arm of a humanoid robot (Refer to Japan Domestic re-publication of PCT international application 2003-090978 and 2003-090979 or the like).

The behavior control system 10 includes a first arithmetic processing element 11 and a second arithmetic processing element 12 and is configured to cause the agent 1 to selectively execute a plurality of subtasks so that the state variable representing the state of the object 2 changes according to a desired state variable trajectory in time series.

The first arithmetic processing element 11 is configured to generate a plurality of state variable trajectories representing the time series of the state variable of the object 2 according to a stochastic transition model. The stochastic transition model is defined so that the state variable of the object is represented as a random variable and the transition mode of the state variable is determined according to each of the execution probabilities of the plurality of subtasks for which the probability distribution is represented by a Dirichlet distribution.

The second arithmetic processing element 12 is configured to control an operation of the agent 1 so that the state of the object 2 transits according to the desired state variable trajectory. The desired state variable is one state variable trajectory which maximizes or optimizes a joint probability of a whole of the stochastic transition model out of the plurality of state variable trajectories generated by the first arithmetic processing element 11.

The term "state variable" means a concept including a scalar and a vector and means a concept including a probability distribution variable. The position of the state variable means a position in the Euclidean space or the Hilbert space having dimension defined by the dimension of the state variable.

The behavior control system 10 and the first arithmetic processing element 11 and the second arithmetic processing element 12 which are the constituents thereof are each composed of a memory and an arithmetic processing unit (CPU) which reads out required data and programs from the memory and executes arithmetic processing assigned to the arithmetic processing unit. The term "composed of" includes a concept of "programmed"

(Function)

The behavior control system 10 having he above configuration executes control arithmetic processing to cause the agent 1 to selectively execute a plurality of different subtasks accompanied by an interaction between the agent 1 and the object 2.

[First Embodiment]

Figure 2A:
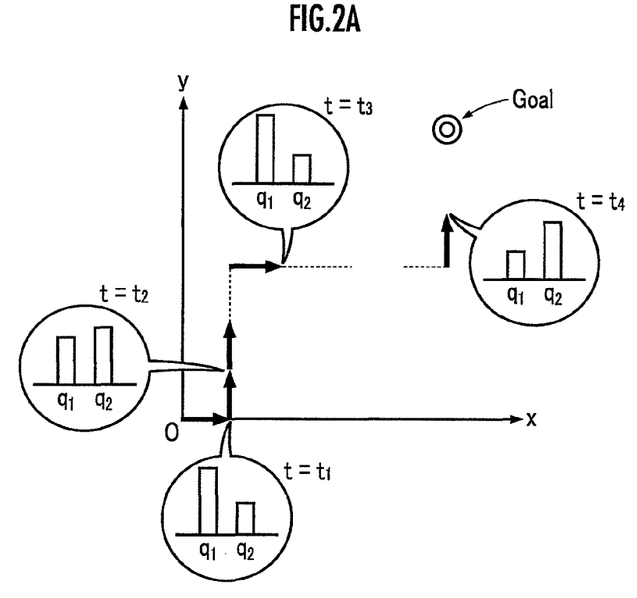
FIG. 2A is an explanatory diagram illustrating a subtask according to a first embodiment and a first continuous mode thereof and FIG. 2B is an explanatory diagram illustrating a subtask of the first embodiment and a second continuous mode thereof.
Figure 2B:
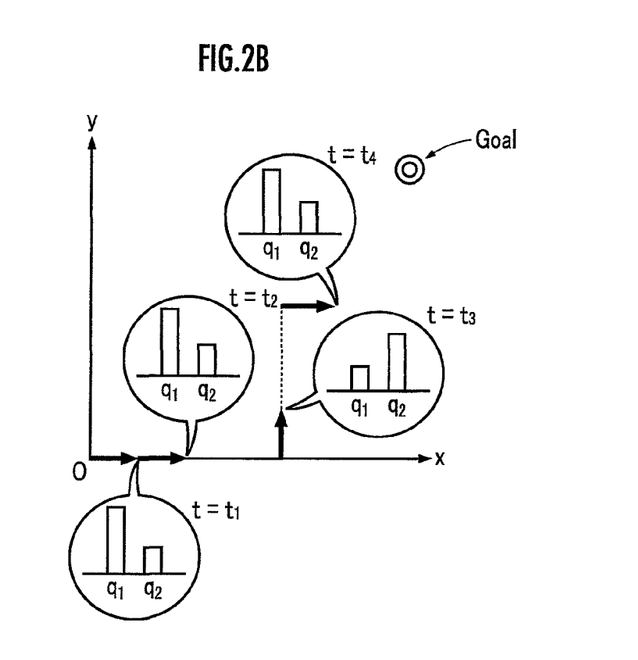

As a plurality of subtasks, an end effector attached to the tip of an arm robot as the agent 1 adopts a first subtask which moves the object 2 in the +x direction by a predetermined amount in the xy-coordinate system and a second subtask which moves the object 2 in the +y direction by a predetermined amount in the xy-coordinate system (See FIGS. 2A and 2B). The initial state of the object 2 is defined by the origin coordinate value (0, 0) of the xy-coordinate system.

(Stochastic Transition Model)

The stochastic transition model is defined by state variables of the object 2 illustrated in Table 1 and variables representing execution subtasks illustrated in Table 2.

TABLE 1

| X | x-coordinate value of object 2 |
| Y | y-coordinate value of object 2 |
| Δx | Amount of translation of object 2 in x direction |
| Δy | Amount of translation of object 2 in y direction |

TABLE 2

| $S_1$ | 1 | if argmax (qi) = q1 |
| | 0 | Else |
| $S_2$ | 1 | if argmax (qi) = q2 |
| | 0 | Else |

Specifically, the stochastic transition model is defined by relational expressions (101) and (102) on the basis of the variables at time t=k (accurately which means a product k×T of the number k of executions of arithmetic processing and the arithmetic processing cycle T with time t=0 as a reference):

$$x(k+1)=x(k)+S_1\delta x(k+1) \quad (101)$$

$$y(k+1)=y(k)+S_2\delta y(k+1) \quad (102)$$

Each of the relational expressions (101) and (102) represents that the x-coordinate value and the y-coordinate value of the object 2 are continuous random variables which continuously or smoothly change.

The first and second subtasks are events which cannot be executed or occur at a time and therefore an execution probability $q_i$ of each subtask is evaluated or computed according to the Dirichlet distribution (a beta distribution due to two variables in this embodiment). Each of the coefficients $S_1$ and $S_2$ are determined according to the execution probability $q_i$ for each of the first and second subtasks for which the probability distribution is represented by the Dirichlet distribution, and the value of the execution probability $q_i$ determines the transition mode of the state variable concerned.

Each of the coefficients $S_1$ and $S_2$ in the relational expressions (101) and (102) is, as illustrated in Table 2, defined so as to be set to "1" or "0" according to whether the probability that each of the first and second subtasks is executed is high or low.

The coefficient "$S_1$" is defined so as to be set to "1" in the case where the execution probability $q_1$ of the first subtask in the Dirichlet distribution is maximum and set to "0" in other cases. The coefficient "$S_2$" is defined so as to be set to "1" in the case where the execution probability $q_2$ of the second subtask in the Dirichlet distribution is maximum and set to "0" in other cases.

Figure 3:
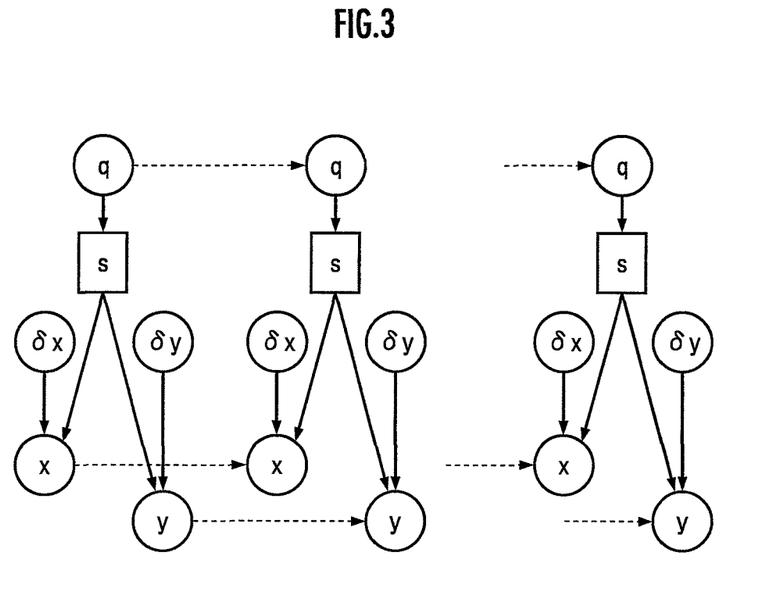
FIG. 3 is an explanatory diagram of a stochastic transition model (DBN) according to the first embodiment.

The stochastic transition model is represented by the dynamics Bayesian network (DBN) illustrated in FIG. 3. According to the DBN, the relational expressions (101) and (102) are represented by arrows connecting nodes (circles) representing the state variables at time k and conditional probabilities by using the nodes and the conditional probabilities.

The conditional probabilities respectively corresponding to the relational expressions (101) and (102) are represented by relational expressions (111) and (112), respectively:

$$P(x(k+1)|x(k),S(k+1))=N(x(k)+S_1\delta x(k+1),\Sigma x) \quad (111)$$

$$P(y(k+1)|Y(k),S(k+1))=N(y(k)+S_2\delta y(k+1),\Sigma y) \quad (112)$$

The state variable nodes δP in the respective relational expressions (111) and (112) are represented by relational expressions (121) and (122):

$$P(\delta x(k))=N(0,e^{-6}) \quad (121)$$

$$P(\delta y(k))=N(0,e^{-6}) \quad (122)$$

The first arithmetic processing element 11 generates a plurality of state variable trajectories according to the stochastic transition model represented by the DBN. As a method of estimating the nodes in the DBN, other methods may be used such as loopy belief propagation, variable elimination, junction tree, importance sampling, Hugin algorithm, Shafer-Shenoy algorithm, variational message passing, Gibbs sampling, or the like.

For example, in the case where the execution probabilities $(q_1, q_2)$ of the subtasks in the Dirichlet distribution vary as illustrated by the bar chart in FIG. 2A along with time transition $t=t_1 \rightarrow t_2 \rightarrow t_3 \rightarrow t_4$, the coefficients $(S_1, S_2)$ transit like $(1, 0) \rightarrow (0, 1) \rightarrow (1, 0) \rightarrow (0, 1)$ (See Table 2). In addition, in the case where the execution probabilities $(q_1, q_2)$ of the subtasks in the Dirichlet distribution vary as illustrated by the bar chart in FIG. 2B along with time transition $t=t_1 \rightarrow t_2 \rightarrow t_3 \rightarrow t_4$, the coefficients $(S_1, S_2)$ transit like $(1, 0) \rightarrow (1, 1) \rightarrow (0, 1) \rightarrow (1, 0)$. The nodes are estimated with respect to each of these various transition modes, by which a plurality of state variable trajectories are generated (See the arrows in FIGS. 2A and 2B).

The second arithmetic processing element 12 controls the operation of the agent 1 so that the state of the object 2 transits according to a desired state variable trajectory, which is one state variable trajectory maximizing or optimizing the joint probability of the stochastic transition model out of the plurality of state variable trajectories generated by the first arithmetic processing element 11. Thereby, the agent 1 selectively executes the first and second subtasks.

The value of the state variable of the object 2 is measured by a sensor group of the agent 1 and the operation of the actuator constituting the agent 1 is feedback-controlled so that the measured value coincides with a desired value (Goal) which is represented by the desired state variable trajectory.

CALCULATION EXAMPLE

Figure 4A:
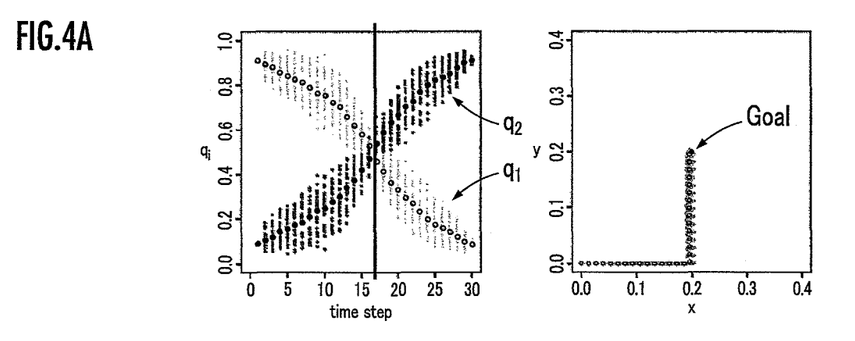
FIG. 4A is an explanatory diagram of a first calculation result of a desired state variable trajectory according to the first embodiment, FIG. 4B an explanatory diagram of a second calculation result of the desired state variable trajectory according to the first embodiment.
Figure 4B:
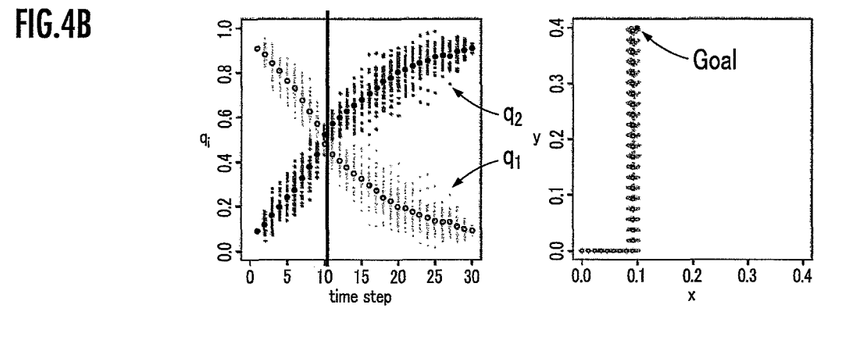
Figure 4C:
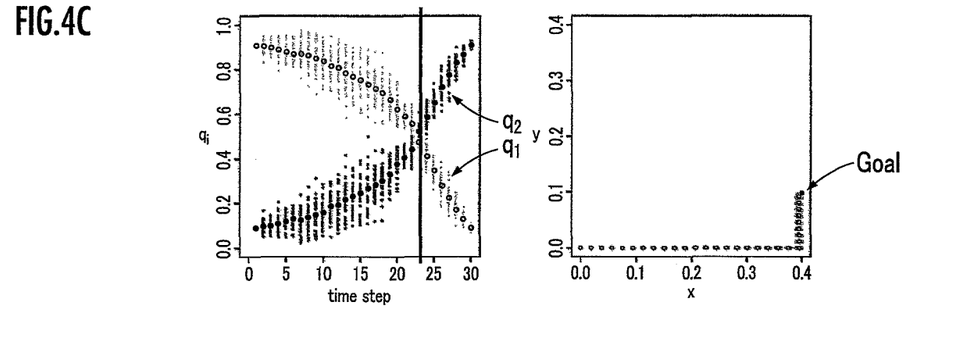
FIG. 4C is an explanatory diagram of a third calculation result of the desired state variable trajectory according to the first embodiment.

From a viewpoint of reducing the arithmetic processing load of the behavior control system 10, a calculation was made on a state variable trajectory for causing the state variable (x, y) of the object 2 to reach the goal (subgoal) Goal, which is illustrated to the right side of FIGS. 4A to 4C, according to a rule that the second subtask is executed after the execution of the first subtask.

To the left side of each of FIGS. 4A to 4C, there is illustrated a variation mode of each execution probability distribution of the first and second subtasks. The horizontal axis represents time k and the vertical axis represents a probability $q_i$ that each subtask is executed. The execution probability distribution of the first subtask is drawn with low brightness and the maximum probability (hereinafter, referred to as "first execution probability") is indicated by "○" Similarly, the execution probability distribution of the second subtask is drawn with high brightness extending in the vertical direction and the maximum probability (hereinafter, referred to as "second execution probability") is indicated by "●".

The position of the object 2 in the initial state (k=1) is previously set to the origin position, and therefore the spread of each probability distribution is zero while the spread of each probability distribution varies with time. This means that, even if the execution of the first subtask is selected as a result, the execution of the second subtask is also taken into consideration until the first subtask is selected. Specifically, it means that both of the execution probability $q_1$ of the first subtask and the execution probability $q_2$ of the second subtask are constantly taken into consideration as represented by the bar graphs illustrated in FIGS. 2A and 2B.

As illustrated in the left side of FIG. 4A, the first execution probability is higher than the second execution probability at time k of 1 to 16 (k=1 to 16), while the first execution probability is lower than the second execution probability at time k of 17 to 30 (k=17 to 30). According thereto, as illustrated in the right side of FIG. 4A, there is generated a desired state variable trajectory of the object 2 for causing the agent 1 to execute the first subtask until the state variable (x, y) of the object 2 changes to (0.2, 0) and to switch the subtasks between time k of 16 and time k of 17 (k=16 to 17) and thereafter to execute the second subtask until the state variable (x, y) of the object 2 changes to (0.2, 0.2). The desired state variable trajectory is represented by a probability distribution having a distribution width as indicated by a solid line in the right side of FIG. 4A.

As illustrated in the right side of FIG. 4B, there is generated a desired state variable trajectory of the object 2 for causing the agent 1 to execute the first subtask until the state variable (x, y) of the object 2 changes to (0.1, 0) and to switch the subtasks between time k of 10 and time k of 11 (k=10 to 11) and thereafter to execute the second subtask until the state variable (x, y) of the object 2 changes to (0.1, 0.4).

As illustrated in the right side of FIG. 4C, there is generated a desired state variable trajectory of the object 2 for causing the agent 1 to execute the first subtask until the state variable (x, y) of the object 2 changes to (0.4, 0) and to switch the subtasks between time k of 23 and time k of 24 (k=23 to 24) and thereafter to execute the second subtask until the state variable (x, y) of the object 2 changes to (0.4, 0.1).

[Second Embodiment]

Figure 5A:
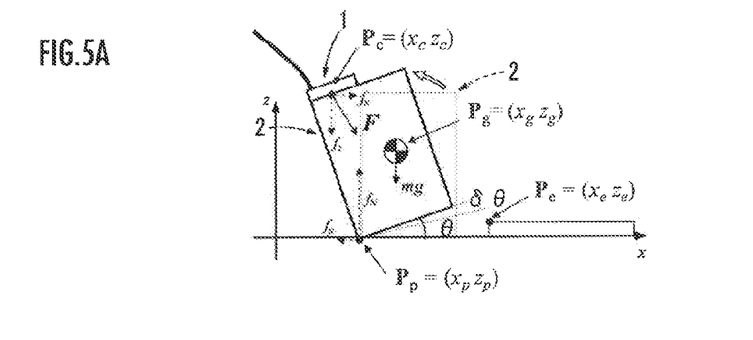
FIG. 5A is a general schematic diagram illustrating a first subtask according to a second embodiment.

The first subtask (roll) is a task of tilting the object 2 so as to lift the undersurface (bottom surface) of the object 2 placed on a first floor surface from the first floor surface with one side of the undersurface of the object 2 as an axis line (See FIG. 5A). The term "floor surface" is not limited to the floor surface of a building structure or the like, but means an upper surface of all kinds of structural object such as the upper surface of a desk, a road surface, a ground surface, or the like.

Figure 5B:
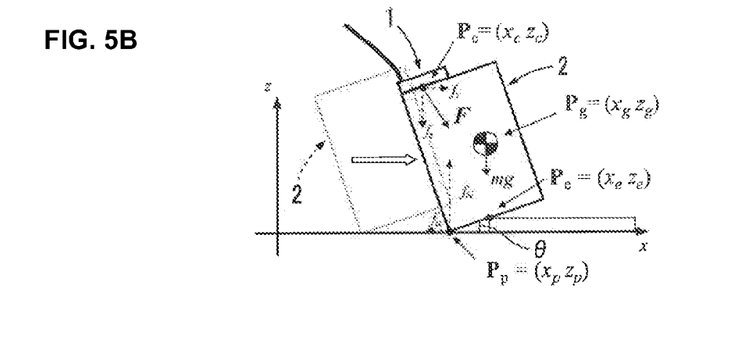
FIG. 5B is a general schematic diagram illustrating a second subtask according to the second embodiment.

The second subtask (slide) is a task of translationally moving the object 2 with one side of the undersurface abuts against the first floor surface while maintaining the tilting posture of the object 2 achieved by the execution of the first subtask (See FIG. 5B).

Figure 5C:
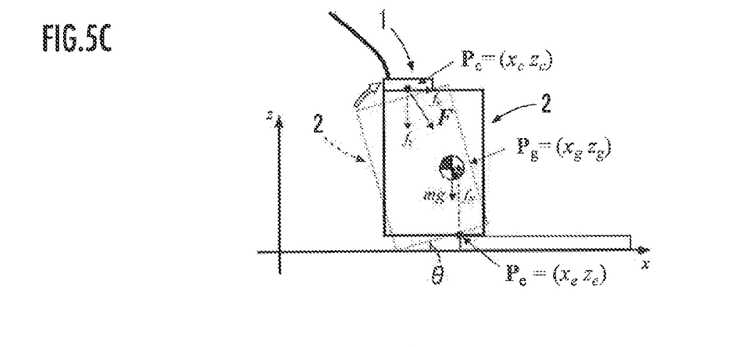
FIG. 5C is a general schematic diagram illustrating a third subtask according to the second embodiment.

The third subtask (hump) is a task of tilting the object 2 so that a part of the undersurface of the object 2 abuts against a second floor surface, which is higher by one step than a first floor surface, with a line segment abutting against the edge of the stepped portion between the first floor surface and the second floor surface as an axis line on the undersurface of the object 2. The tilt direction of the object 2 in the third subtask is opposite to the tilt direction of the object 2 in the first subtask (See FIG. 5C).

Figure 5D:
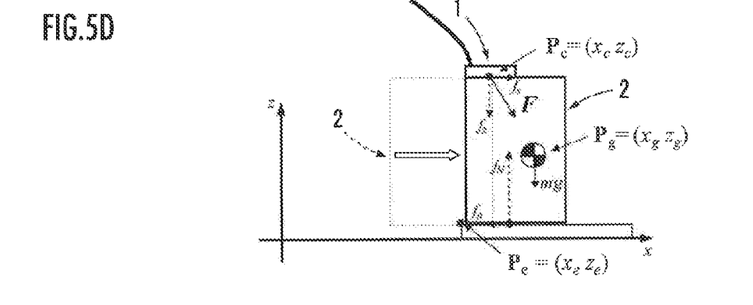
FIG. 5D is a general schematic diagram illustrating a fourth subtask according to the second embodiment.

The fourth subtask (push) is a task of translationally moving the object 2 with a part of the undersurface abutting against the second floor surface (See FIG. 5D).

A plurality of subtasks are executed with an end effector attached to the tip of the arm robot as the agent 1 abutting against the upper surface of the object 2 which is substantially rectangular parallelepiped. The behavior of the agent 1 is controlled according to the position of the end effector and the trajectory of an applied force to the object 2.

The position of the end effector (the position of a force application point) is defined by, for example, the position of the palm of a robot hand having a plurality of finger mechanisms extended from the palm or the position of the tip of one finger mechanism (fingertip).

(Stochastic Transition Model)

The stochastic transition model is defined by state variables of the object 2 illustrated in Table 3 and variables representing execution subtasks illustrated in Table 4.

TABLE 3

| | |
|---|---|
| F = (fx, fz) | Force of end effector to object 2 |
| Pc = (xc, zc) | Position where force F is applied (position of end effector) |
| fN | Normal force applied to object 2 from floor surface |
| Fµ | Friction force applied to object 2 from floor surface |
| Pp = (xp, zp) | Positions where normal force $f_N$ and friction force $f_\mu$ are applied |
| m | Mass of object 2 |
| g | Gravitational acceleration |
| Pg = (xg, zg) | Center-of-gravity location of object 2 |
| Pe = (xe, ze) | Edge position of stepped portion between first and second floor surfaces |
| δP = (δx, 0) | Amount of translation in x direction of object 2 |
| θ | Inclination angle of undersurface of object 2 to horizontal plane |
| δθ | Amount of inclination of object 2 (Amount of change in inclination angle θ) |

TABLE 4

| | | |
|---|---|---|
| $S_1$ | 1 | if argmax (qi) = q1 or q3 |
| | 0 | Else |
| $S_2$ | 1 | if argmax (qi) = q2 or q4 |
| | 0 | Else |
| $S_3$ | 1 | if argmax (qi) = q3 |
| | 0 | Else |

Specifically, the stochastic transition model is defined by relational expressions (201) to (207) on the basis of the variables at time t=k (accurately which means a product k×T of the number k of executions of arithmetic processing and the arithmetic processing cycle T with time t=0 as a reference):

$$P_c(k+1)=R(k)\{P_c(k)-P_p(k)\}+P_p(k)+S_2\delta P(k+1),$$
$$R(k)=\{r_{ij}\}, r_{11}=\cos\delta\theta, r_{12}=-\sin\delta\theta, r_{21}=\sin\delta\theta, r_{22}=\cos\delta\theta \quad (201)$$

$$P_g(k+1)=R(k)\{P_g(k)-P_p(k)\}+P_p(k)+S_2\delta P(k+1) \quad (202)$$

$$P_p(k+1)=(1-S_3)P_p(k)+S_3 P_e(k)+S_2\delta P(k+1) \quad (203)$$

$$\theta(k+1)=\theta(k)+S_1\delta\theta(k+1) \quad (204)$$

$$P_e(k+1)=P_e(k) \quad (205)$$

$$f_x(k)=\mu f_N(k), f_z(k)=f_N(k)-mg \quad (206)$$

$$mg(x_g(k)-x_p(k))+f_x(k)(z_c(k)-z_p(k))+f_z(k)(x_c(k)-x_p(k))=0 \quad (207)$$

The relational expressions (201) to (203) represent that the positions Pc, Pp, and Pg are continuous random variables which continuously or smoothly change, respectively. R is a matrix for converting the amount of inclination δθ of the object 2 to a variation amount of each of the positions Pc, Pp, and Pg. The relational expression (204) represents that an angle θ is a continuous random variable which continuously or smoothly changes. The relational expression (205) means that the edge position of the stepped portion between the first and second floor surfaces remains unchanged. The relational expression (206) represents that the force applied to the object 2 is balanced. The relational expression (207) represents that the moment about the position $P_p$ applied to the object 2 is balanced.

The first to fourth subtasks are events which cannot be executed or occur at a time and therefore an execution probability $q_i$ of each subtask is evaluated or computed according to the Dirichlet distribution. Each of the coefficients $S_1$ to $S_3$ are determined according to the execution probability $q_i$ for each of the plurality of subtasks for which the probability distribution is represented by the Dirichlet distribution, and the value of the execution probability $q_i$ determines the transition mode of the state variable concerned.

The Dirichlet distribution function, which is a continuous distribution function, means a multivariate beta distribution in which a beta distribution is extended and generalized. The probability density function P(^Q, ^K) of the Dirichlet distribution gives a probability that each event occurs with the probability $q_i$ in the case where each of N events (four subtasks in this embodiment) which do not occur at a time occurs ($k_i$−1) times (i=1, 2, - - - N), where "$k_i$" denotes a hyperparameter (a parameter of a parameter) and may be an integer or not.

The following relational expression (21) defines a probability density function P(^Q, ^K) of the Dirichlet distribution with a vector ^K=($k_1$, - - - $k_i$, - - - $k_N$) as a parameter and a real vector ^Q=($q_1$, - - - $q_i$, - - - $q_N$) as a random variable:

$$P(\hat{Q},\hat{K})=(1/Z)\pi_{i=1}^{N}q_i^{k_i-1} \quad (21)$$

Here, "Z" is a beta function extended to be multivariate and defined by a relational expression (22) using a gamma function Γ.

$$Z = \pi_{i=1}^{\ \ N}\Gamma(k_i)/\Gamma(\Sigma_{i=1}^{\ \ N}k_i) \quad (22)$$

The Dirichlet distribution is used to represent disagreements observed in the case where the number of trials is finite with respect to a relative frequency $q_i$ of occurrence of each event in the case where the number of trials is infinite. An expected value $E[q_i]$ of the probability $q_i$ that each event occurs is represented by a relational expression (23). A variance $V[q_i]$ of the probability $q_i$ is represented by a relational expression (24).

$$E[q_i] = k_i/\Sigma_{i=1}^{\ \ N}k_i \quad (23)$$

$$V[q_i] = k_i/\Sigma_{j=1}^{\ \ N(exclude\ j)}/\{(\Sigma_{i=1}^{\ \ N}k_i)^2(1+\Sigma_{i=1}^{\ \ N}k_i)\} \quad (24)$$

Each of the coefficients $S_1$ to $S_3$ in the relational expressions (201) to (204) is, as illustrated in Table 2, defined so as to be set to "1" or "0" according to whether the probability that each of the first to fourth subtasks is executed is high or low.

The coefficient "$S_1$" is defined so as to be set to "1" in the case where the execution probability $q_1$ of the first subtask or the execution probability $q_3$ of the third subtask in the Dirichlet distribution is maximum and set to "0" in other cases. The coefficient "$S_2$" is defined so as to be set to "1" in the case where the execution probability $q_2$ of the second subtask or the execution probability $q_4$ of the fourth subtask in the Dirichlet distribution is maximum and set to "0" in other cases. The coefficient "$S_3$" is defined so as to be set to "1" in the case where the execution probability $q_3$ of the third subtask in the Dirichlet distribution is maximum and set to "0" in other cases.

Figure 6:
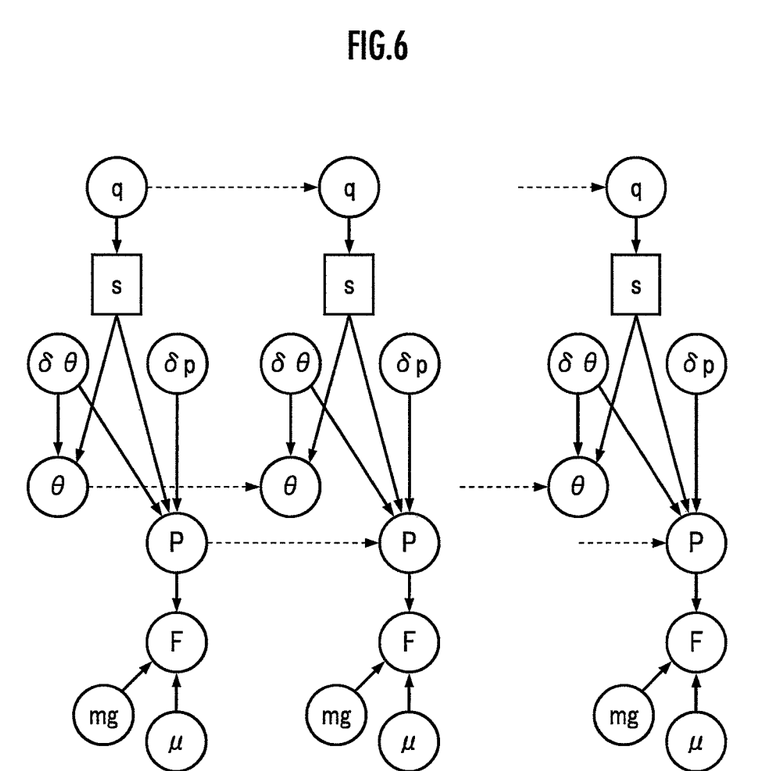
FIG. 6 is an explanatory diagram of a stochastic transition model (DBN) according to the second embodiment.

The stochastic transition model is represented by the dynamics Bayesian network (DBN) illustrated in FIG. 6. According to the DBN, the relational expressions (201) to (207) are represented by arrows connecting nodes (circles) representing the state variables at time k and conditional probabilities by using the nodes and the conditional probabilities.

The conditional probabilities respectively corresponding to the relational expressions (201) to (206) are represented by relational expressions (211) to (216), respectively:

$$P(P_c(k+1)|P_c(k),\delta\theta(k+1),\delta P(k+1),S(k+1)) = N(R(k)\{P_c(k)-P_p(k)\}+P_p(k)+S_2\delta P(k+1),\Sigma_{Pc}) \quad (211)$$

$$P(P_g(k+1)|P_g(k),\delta\theta(k+1),\delta P(k+1),S(k+1)) = N(R(k)\{P_g(k)-P_p(k)\}+P_p(k)+S_2\delta P(k+1),\Sigma_{Pg}) \quad (212)$$

$$P(P_p(k+1)|P_p(k),\delta\theta(k+1),\delta P(k+1),S(k+1)) = N((1-S_3)P_p(k)+S_3P_e(k)+S_2\delta P(k+1),\Sigma_{Pp}) \quad (213)$$

$$P(\theta(k+1)|\theta(k),\delta\theta(k+1)) = N(\theta(k)+S_1\delta\theta(k+1),\Sigma\theta) \quad (214)$$

$$P(P_e(k+1)|P_e(k)) = N(P_e(k),\Sigma_{Pp}) \quad (215)$$

$$P(f_x(k)|mg,\mu,P_c(k),P_g(k),P_p(k),P_e(k)) = N(\mu mg(x_c-x_g)/\{x_c-x_p+\mu(z_c-z_p)\},\Sigma_{fx}), P(f_z(k)|mg,\mu,P_c(k),P_g(k),P_p(k),P_e(k)) = N(mg(x_c-x_g)/\{x_c-x_p+\mu(z_c-z_p)\}-mg,\Sigma_{fz}) \quad (216)$$

The state variable node 8P in each of the relational expressions (211) to (213) is represented by a relational expression (221). The state variable node 60 in the relational expression (214) is represented by a relational expression (222).

$$P(\delta P(k)) = N(0,e^{-6}) \quad (221)$$

$$P(\delta\theta(k)) = N(0,\Sigma_\beta) \quad (222)$$

The first arithmetic processing element 11 generates a plurality of state variable trajectories according to the stochastic transition model represented by the DBN similarly to the first embodiment.

For example, in the case where the execution probabilities ($q_1$, $q_2$, $q_3$, $q_4$) of the subtasks in the Dirichlet distribution vary along with time transition $t=t_1 \rightarrow t_2 \rightarrow t_3 \rightarrow t_4$ like (0.5, 0.2, 0.2, 0.1)→(0.2, 0.4, 0.3, 0.2)→(0.1, 0.2, 0.6, 0.1)→(0.1, 0.2, 0.3, 0.4), the coefficients ($S_1$, $S_2$, $S_3$, $S_4$) transit like (1, 0, 0)→(0, 1, 0)→(1, 0, 1)→(0, 1, 0) (See Table 2). In addition, in the case where the execution probabilities ($q_1$, $q_2$, $q_3$, $q_4$) of the subtasks vary like (0.5, 0.2, 0.2, 0.1)→(0.2, 0.4, 0.3, 0.2)→(0.1, 0.2, 0.3, 0.4)→(0.1, 0.2, 0.6, 0.1), the coefficients ($S_1$, $S_2$, $S_3$) transit like (1, 0, 0)→(0, 1, 0)→(0, 1, 0)→(1, 0, 1). The nodes are estimated with respect to each of these various transition modes, by which a plurality of state variable trajectories are generated.

The second arithmetic processing element 12 controls the operation of the agent 1 so that the state of the object 2 transits according to a desired state variable trajectory, which is one state variable trajectory maximizing or optimizing the joint probability of the stochastic transition model out of the plurality of state variable trajectories generated by the first arithmetic processing element 11. Thereby, the agent 1 selectively executes the first to fourth subtasks illustrated in FIGS. 5A to 5D.

The value of the state variable of the object 2 is measured by a sensor group of the agent 1 and the operation of the actuator constituting the agent 1 is feedback-controlled so that the measured value coincides with a desired value represented by the desired state variable trajectory. For example, a force F which the agent 1 applies to the object 2 is measured by a force sensor (a six-axis force sensor or the like) attached to the end effector. With respect to the position of a force application point Pc, the angles of the joints constituting the agent 1 are measured according to a kinematics model of the agent 1 on the basis of output signals from an angle sensor composed of an encoder or the like.

The edge position Pe of the stepped portion between the first and second floor surfaces may be measured on the basis of an output signal from an object detection sensor such as a range image sensor of the agent 1 or may be previously input to a memory constituting the behavior control system 10.

CALCULATION EXAMPLE

From a viewpoint of reducing the arithmetic processing load of the behavior control system 10, a calculation was made on a state variable trajectory for causing the state variable of the object 2 to reach the goal (subgoal) Goal, which is illustrated in FIG. 5D, according to a rule that the second subtask is executed after the execution of the first subtask, the third subtask is executed after the execution of the second subtask, and the fourth subtask is executed after the execution of the third subtask.

From a viewpoint of reducing the arithmetic processing load, the first to third desired state variable trajectories were calculated according to each of "a first stochastic transition model" in which the first and second subtasks are taken into consideration, "a second stochastic transition model" in which the second and third subtasks are taken into consideration, and "a third stochastic transition model" in which the third and fourth subtasks are taken into consideration according to the Dirichlet distribution with N=2, instead of the Dirichlet distribution with N=4.

Figure 7A:
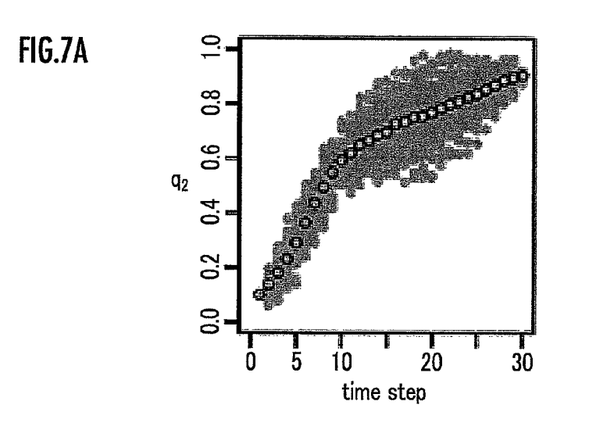
FIG. 7A is an explanatory diagram of a first calculation result of a desired state variable trajectory.

FIG. 7A illustrates a variation mode of the execution probability $q_2$ of the second subtask estimated in the generation process of the first desired state variable trajectory. Specifically, FIG. 7A illustrates the variation mode of the execution probability $q_2$ of the second subtask estimated in the generation process of one first state variable trajectory in which the joint probability of the first stochastic transition model is maximum or optimum among a plurality of first state variable trajectories accompanied by switching from the first subtask (roll) to the second subtask (slide).

A line segment existing in the vertical axis direction with the maximum probability (See "○") as a reference represents the spread of the probability distribution of the probability $q_2$. If the probability $q_2$ is less than 0.5, it means the probability that the first subtask is executed is higher than the probability that the second subtask is executed. If the probability $q_2$ exceeds 0.5, it means the probability that the second subtask is executed is higher. From FIG. 7A, it is understood that there is generated a first desired state variable trajectory in which the execution target is switched from the first subtask to the second subtask between 8 and 9 of time k.

Figure 7B:
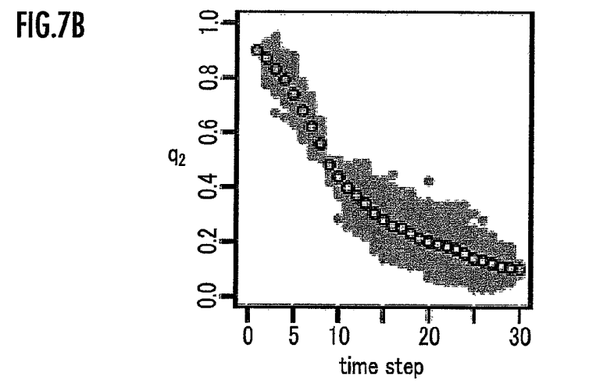
FIG. 7B is an explanatory diagram of a second calculation result of the desired state variable trajectory.

FIG. 7B illustrates a variation mode of the execution probability $q_2$ of the second subtask estimated in the generation process of the second desired state variable trajectory. Specifically, FIG. 7B illustrates the variation mode of the execution probability $q_2$ of the second subtask estimated in the generation process of one second state variable trajectory in which the joint probability of the first stochastic transition model is maximum or optimum among a plurality of second state variable trajectories accompanied by switching from the second subtask (slide) to the third subtask (hump).

If the probability $q_2$ exceeds 0.5, it means the probability that the second subtask is executed is higher than the probability that the third subtask is executed. If the probability $q_2$ is less than 0.5, it means the probability that the third subtask is executed is higher. From FIG. 7B, it is understood that there is generated a second desired state variable trajectory in which the execution target is switched from the second subtask to the third subtask between 8 and 9 of time k.

Figure 7C:
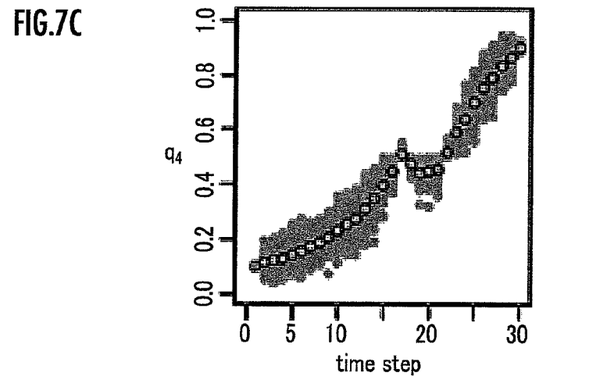
FIG. 7C is an explanatory diagram of a third calculation result of the desired state variable trajectory.

FIG. 7C illustrates a variation mode of the execution probability $q_4$ of the fourth subtask estimated in the generation process of the third desired state variable trajectory. Specifically, FIG. 7C illustrates the variation mode of the execution probability $q_4$ of the fourth subtask estimated in the generation process of one third state variable trajectory in which the joint probability of the first stochastic transition model is maximum or optimum among a plurality of third state variable trajectories accompanied by switching from the third subtask (hump) to the fourth subtask (push).

If the probability $q_4$ exceeds 0.5, it means the probability that the fourth subtask is executed is higher than the probability that the third subtask is executed. If the probability $q_4$ is less than 0.5, it means the probability that the third subtask is executed is higher. From FIG. 7C, it is understood that there is generated a third desired state variable trajectory in which the execution target is switched from the third subtask to the fourth subtask between 22 and 23 of time k.

Additionally, the second arithmetic processing element 12 controls the behavior of the agent 1 so that the state of the object 2 transits according to a desired state variable trajectory as a continuous trajectory of the first, second, and third desired state variable trajectories. This causes the agent 1 to execute the first to fourth subtasks sequentially for the object 2 and enables the state of the object 2 to reach a desired goal.

[Operation and Effect]

According to the behavior control system 10 having the above configuration, a plurality of state variable trajectories which are the time series of the state variable are generated according to the stochastic transition model (See FIGS. 3 and 6) which is defined so that the transition mode of the state variable of the object 2 is determined depending on each execution probability $q_i$ of the plurality of subtasks in which the probability distribution is represented by a Dirichlet distribution (See FIGS. 2A and 2B). Thereby, the plurality of state variable trajectories are generated with the consideration for various variation modes of subtasks selectively executed by the agent 1 according to a difference in the time-oriented variation mode of the Dirichlet distribution.

One state variable trajectory which the agent 1 follows among the plurality of state variable trajectories is generated as a desired state variable trajectory if it maximizes or optimizes the joint probability of the stochastic transition model (See FIGS. 4A to 4C and FIGS. 7A to 7C). The desired state variable trajectory is generated on the basis of the stochastic transition model as described above. Therefore, the behavior of the agent 1 accompanied by an interaction with the object 2 is able to be controlled so that the continuity of the state variables representing the state of the object 2 is secured. As a result, while the executability of each subtask secures the continuity of behavior of the agent 1 in time series, the behavior control system is able to cause the agent 1 to execute a plurality of different subtasks continuously (See FIGS. 5A to 5D).

[Other Embodiments of the Present Invention]

The first arithmetic processing element 11 is configured to generate a plurality of state variable trajectories according to each of a plurality of stochastic transition models different in environmental factor, which is the stochastic transition model in which the transition mode of a state variable is determined depending on the environmental factor of the object 2 in addition to the respective execution probabilities of the plurality of subtasks. The second arithmetic processing element 12 is configured to estimate an environmental factor in one stochastic transition model, which is a generation base of one state variable trajectory which maximizes or optimizes the joint probability of a whole of the stochastic transition model among the plurality of state variable trajectories generated by the first arithmetic processing element 11, as an actual environmental factor.

For example, at least one of a friction force $f_\mu$ applied to the object 2 from the floor surface, a friction coefficient $\mu$, a normal force $f_N$, and a posture on the floor surface (an inclination angle) is estimated as an environmental factor (See Table 3).

According to the behavior control system having the above configuration, an environmental factor such as a friction coefficient $\mu$ between the object 2 and the floor surface, which is an uncertain element, is able to be estimated with a high degree of accuracy on the basis of the generation result of the desired state variable trajectory. The subsequent stochastic transition models are selected or constructed on the basis of the estimation result, thereby enabling the generation of a desired state variable trajectory which reflects the state of the object 2 appropriate to the actual environmental factor.

What is claimed is:

1. A system configured to control a behavior of a robot to cause the robot to selectively execute a plurality of subtasks for an object, the system comprising a processor and a memory having stored thereon a program which, when executed by the processor, causes the processor to function as:

a first arithmetic processing element configured to generate a plurality of state variable trajectories which represent time series of a state variable of the object according to a stochastic transition model in which the state variable of the object is represented as a random variable and in which the transition mode of the state variable is determined depending on each execution probability of the plurality of subtasks in which a probability distribution is represented by a Dirichlet distribution; and a second arithmetic processing element configured to control an operation of the robot so that the state of the object transits according to a desired state variable trajectory which is one state variable trajectory maximizing or optimizing a joint probability of a whole of the stochastic transition model among the plurality of state variable trajectories generated by the first arithmetic processing element.

2. The system according to claim 1, wherein:
the first arithmetic processing element is configured to generate a plurality of i-th state variable trajectories which represent time series of the state variable of the object according to an i-th stochastic transition model in which the transition mode of the state variable is determined depending on each execution probability of a subtask having an i-th execution order (i=1, 2, - - - ) and a subtask having an (i+1)-th execution order among the plurality of subtasks; and
the second arithmetic processing element is configured to generate one i-th state variable trajectory which maximizes or optimizes a joint probability of a whole of the i-th stochastic transition model, as an i-th desired state variable trajectory, among the plurality of i-th state variable trajectories generated by the first arithmetic processing element, and to generate a connection trajectory of the i-th desired state variable trajectory as the desired state variable trajectory.

3. The system according to claim 1, wherein:
the first arithmetic processing element is configured to generate the plurality of state variable trajectories according to each of a plurality of stochastic transition models different in environmental factor, which is a stochastic transition model in which the transition mode of the state variable is determined depending on the environmental factor of the object, in addition to the respective execution probabilities of the plurality of subtasks; and
the second arithmetic processing element is configured to estimate an environmental factor in one stochastic transition model which is a generation base of one state variable trajectory which maximizes or optimizes a joint probability of a whole of the stochastic transition model among the plurality of state variable trajectories generated by the first arithmetic processing element, as an actual environmental factor.

4. A method of controlling a behavior of robot to cause the robot to selectively execute a plurality of subtasks for an object, the method comprising:
first arithmetic processing of generating a plurality of state variable trajectories which represent time series of a state variable of the object according to a stochastic transition model in which the state variable of the object is represented as a random variable and in which the transition mode of the state variable is determined depending on each execution probability of the plurality of subtasks in which a probability distribution is represented by a Dirichlet distribution; and second arithmetic processing of controlling an operation of the robot so that the state of the object transits according to a desired state variable trajectory which is one state variable trajectory maximizing or optimizing a joint probability of a whole of the stochastic transition model among the plurality of state variable trajectories generated by the first arithmetic processing.

5. The system according to claim 1, wherein the robot is an arm robot that includes a plurality of links connected to each other via a joint mechanism, and an actuator configured to transmit a force to the joint mechanism to bend and stretch the plurality of links relative to each other around the joint mechanism, and
the second arithmetic processing element is configured to control the actuator of the arm robot to transmit force to the joint mechanism of the arm robot to bend and stretch the plurality of links connected at the joint mechanism so that the state of the object transits according to the desired state variable trajectory.

6. The method of claim 4, wherein the robot is an arm robot that includes a plurality of links connected to each other via a joint mechanism, and an actuator configured to transmit a force to the joint mechanism to bend and stretch the plurality of links relative to each other around the joint mechanism, and
wherein the second arithmetic processing includes controlling the actuator of the arm robot to transmit force to the joint mechanism of the arm robot to bend and stretch the plurality of links connected at the joint mechanism so that the state of the object transits according to the desired state variable trajectory.

7. An arm robot, comprising:
a plurality of links connected to each other via a joint mechanism;
an actuator configured to transmit a force to the joint mechanism to bend and stretch the plurality of links relative to each other around the joint mechanism; and
a system configured to control a behavior of the robot to cause the robot to selectively execute a plurality of subtasks for an object by controlling the actuator,
wherein the system comprises a processor and a memory having stored thereon a program which, when executed by the processor, causes the processor to function as:
a first arithmetic processing element configured to generate a plurality of state variable trajectories which represent time series of a state variable of the object according to a stochastic transition model in which the state variable of the object is represented as a random variable and in which the transition mode of the state variable is determined depending on each execution probability of the plurality of subtasks in which a probability distribution is represented by a Dirichlet distribution; and
a second arithmetic processing element configured to control an operation of the actuator of the arm robot to transmit force to the joint mechanism of the arm robot to bend and stretch the plurality of links connected at the joint mechanism so that the state of the object transits according to a desired state variable trajectory which is one state variable trajectory maximizing or optimizing a joint probability of a whole of the stochastic transition model among the plurality of state variable trajectories generated by the first arithmetic processing element.

* * * * *